United States Patent
Magayi

(10) Patent No.: US 12,344,808 B2
(45) Date of Patent: Jul. 1, 2025

(54) SYSTEMS, METHODS, AND COMPOSITIONS OF INSECT REPELLENT BRIQUETTES

(71) Applicant: Charlot Magayi, Nairobi (KE)

(72) Inventor: Charlot Magayi, Nairobi (KE)

(*) Notice: Subject to any disclaimer, the term of this patent is extended or adjusted under 35 U.S.C. 154(b) by 147 days.

(21) Appl. No.: 18/484,263

(22) Filed: Oct. 10, 2023

(65) Prior Publication Data
US 2025/0115818 A1 Apr. 10, 2025

(51) Int. Cl.
*C10L 5/36* (2006.01)
*A01N 53/00* (2006.01)
*A01P 17/00* (2006.01)

(52) U.S. Cl.
CPC .............. *C10L 5/361* (2013.01); *A01N 53/00* (2013.01); *A01P 17/00* (2021.08)

(58) Field of Classification Search
CPC .......... C10L 5/361; A01N 53/00; A01P 17/00; Y02E 50/30
See application file for complete search history.

(56) References Cited

PUBLICATIONS

Loise Nyakeru Thuku, Development of Fuel Briquettes for Knock-down of Mosquitoes Using Natural Products, 2013, Jomo Kenyatta University of Agriculture and Technology, pp. 1-57 (Year: 2013).*

* cited by examiner

*Primary Examiner* — Taiwo Oladapo
(74) *Attorney, Agent, or Firm* — Womble Bond Dickinson (US) LLP

(57) ABSTRACT

Systems, methods, and compositions to provide insect repellent briquettes for cooking stoves are provided. For example, a fuel briquette composition may include a heating fuel, a first source of an insect repellent, and a second source of the insect repellent, where the second source is different from the first source. As another example, a fuel briquette may include a heating fuel, an accelerant comprising pymarc, a first amount of pyrethrin distributed interstitially between the heating fuel and the accelerant, and a second amount of pyrethrin contained within the pymarc. As a further example, a method of making a fuel briquette may include processing a chrysanthemum material to produce a liquid additive and a solid pymarc, forming a briquette mixture that includes a heating fuel, the solid pymarc, and the liquid additive, and compressing and drying the briquette mixture to form a fuel briquette.

20 Claims, 9 Drawing Sheets

SYSTEMS, METHODS, AND COMPOSITIONS OF INSECT REPELLENT BRIQUETTES

FIELD OF THE DISCLOSURE

Embodiments disclosed herein generally relate to fuel briquettes for cooking stoves. More specifically, one or more embodiments disclosed herein relate to charcoal briquettes for use in cooking stoves that emit insect repellent when combusted as well as systems, methods, and compositions relating thereto.

BACKGROUND

In certain underserved regions, residents may burn solid fuels in open fires or stoves for cooking, heat, or other purposes. A common type of solid fuel used for these purposes is charcoal, such as charcoal briquettes that are configured to burn slowly while providing a high energy output. In particular, a dense structure and low porosity may enable a charcoal briquette to burn over an extended period of time which may be well suited for cooking. In addition, regions in which the population relies on solid fuel fires or stoves for cooking also commonly suffer from insect-borne illnesses such as malaria, which kills thousands of people every year.

SUMMARY

Accordingly, some embodiments disclosed herein are directed to fuel briquettes for use in cooking stoves that are configured to emit insect repellent during combustion, as well as systems, methods, and compositions relating to thereto. For instance, some embodiments disclosed herein are directed to fuel briquettes that are infused with an insect repellent so that combustion of the fuel briquettes is configured to distribute the insect repellent into the surrounding atmosphere and thereby repel flying insects (such as mosquitos). Additionally, embodiments disclosed herein may include fuel briquettes that utilize two different sources of an insect repellent, such as an insect repellent additive that is mixed into a briquette mixture along with agricultural waste or plant solids that contain the insect repellent. The agricultural waste may represent a traditionally underutilized source of the insect repellent, which certain embodiments disclosed herein may leverage for enhanced briquette formations. For example, the agricultural waste may be a lower cost material than the insect repellent additive and may be used to reduce an amount of insect repellent additive used in briquette formations. The agricultural waste of certain embodiments may further operate or function as an accelerant that improves combustibility of the resulting insect repellent briquettes. Thus, through use of embodiments disclosed herein, disease-carrying insects (such as mosquitos) may be repelled from a house, structure, or other location through the common activity of cooking. As a result, embodiments disclosed herein may reduce or even eliminate the demand for more additional (and often costly) insect repelling tools and strategies.

Certain embodiments of the disclosure are directed to a fuel briquette composition including a heating fuel, a first source of an insect repellent, and a second source of the insect repellent. The second source is different from the first source.

In some embodiments, the insect repellent includes one or more pyrethrin compounds. In some embodiments, the first source includes a liquid additive. In some embodiments, the second source includes a byproduct from production of the liquid additive. In some embodiments, the first source is a liquid material and the second source is a solid material. In some embodiments, the first source includes pyrethrum extracted from chrysanthemum plants. In some embodiments, the second source includes pymarc. In some embodiments, the second source is configured to accelerate combustion of the fuel briquette.

In some embodiments, the insect repellent is at least 0.03 wt. % of the fuel briquette composition. In some of these embodiments, the fuel briquette further includes (i) an accelerant that includes the second source of the insect repellent and (ii) a binder. The heating fuel includes charcoal powder and is approximately 65 wt. % of the fuel briquette composition, the accelerant is approximately 28 wt. % of the fuel briquette composition, and a mixture of the insect repellent and the binder is approximately 7 wt. % of the fuel briquette composition.

Certain embodiments of the disclosure are directed to a fuel briquette including a heating fuel, an accelerant including pymarc, a first amount of pyrethrin distributed interstitially between the heating fuel and the accelerant, and a second amount of pyrethrin contained within the pymarc. The first amount of pyrethrin and the second amount of pyrethrin are configured to vaporize with products of combustion of the heating fuel to thereby repel insects from a surrounding area.

In some embodiments, the fuel briquette includes at least 0.03 wt. % of pyrethrin. In some embodiments, at least 0.01 wt. % of the pyrethrin in the fuel briquette is sourced from the pymarc. In some embodiments, the fuel briquette includes a liquid additive that includes the first amount of pyrethrin, and at least 0.01 wt. % of the pyrethrin in the fuel briquette is sourced from the liquid additive. In some embodiments, the liquid additive is an extraction from the pymarc. In some embodiments, the fuel briquette includes a binder and an additional accelerant. The binder includes one or more of starch, clay, or soil, and the additional accelerant includes agricultural waste or sawdust.

Certain embodiments of the disclosure are directed to a method of making a fuel briquette, where the method includes processing a chrysanthemum material to produce a liquid additive and a solid pymarc. The method includes forming a briquette mixture that includes a heating fuel, the solid pymarc, and the liquid additive. The method includes compressing the briquette mixture with a compression machine to form a compressed briquette mixture and drying the compressed briquette mixture to form a fuel briquette.

In some embodiments, the fuel briquette includes at least 0.03 wt. % of pyrethrin contributed partially from the liquid additive and partially from the solid pymarc. In some embodiments, forming the briquette mixture includes forming a first intermediate mixture from at least the heating fuel and the solid pymarc, forming a second intermediate mixture from at least a binder and the liquid additive, and combining the first intermediate mixture with the second intermediate mixture to form the briquette mixture. In some embodiments, the method includes diluting the insect repellent additive with a solvent, and drying the compressed briquette mixture evaporates the solvent.

Still other aspects and advantages of these and other embodiments are discussed in detail herein. Moreover, it is to be understood that both the foregoing information and the following detailed description provide merely illustrative examples of various aspects and embodiments and are intended to provide an overview or framework for understanding the nature and character of the claimed aspects and embodiments. Accordingly, the advantages and features of the present disclosure will become more apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1:
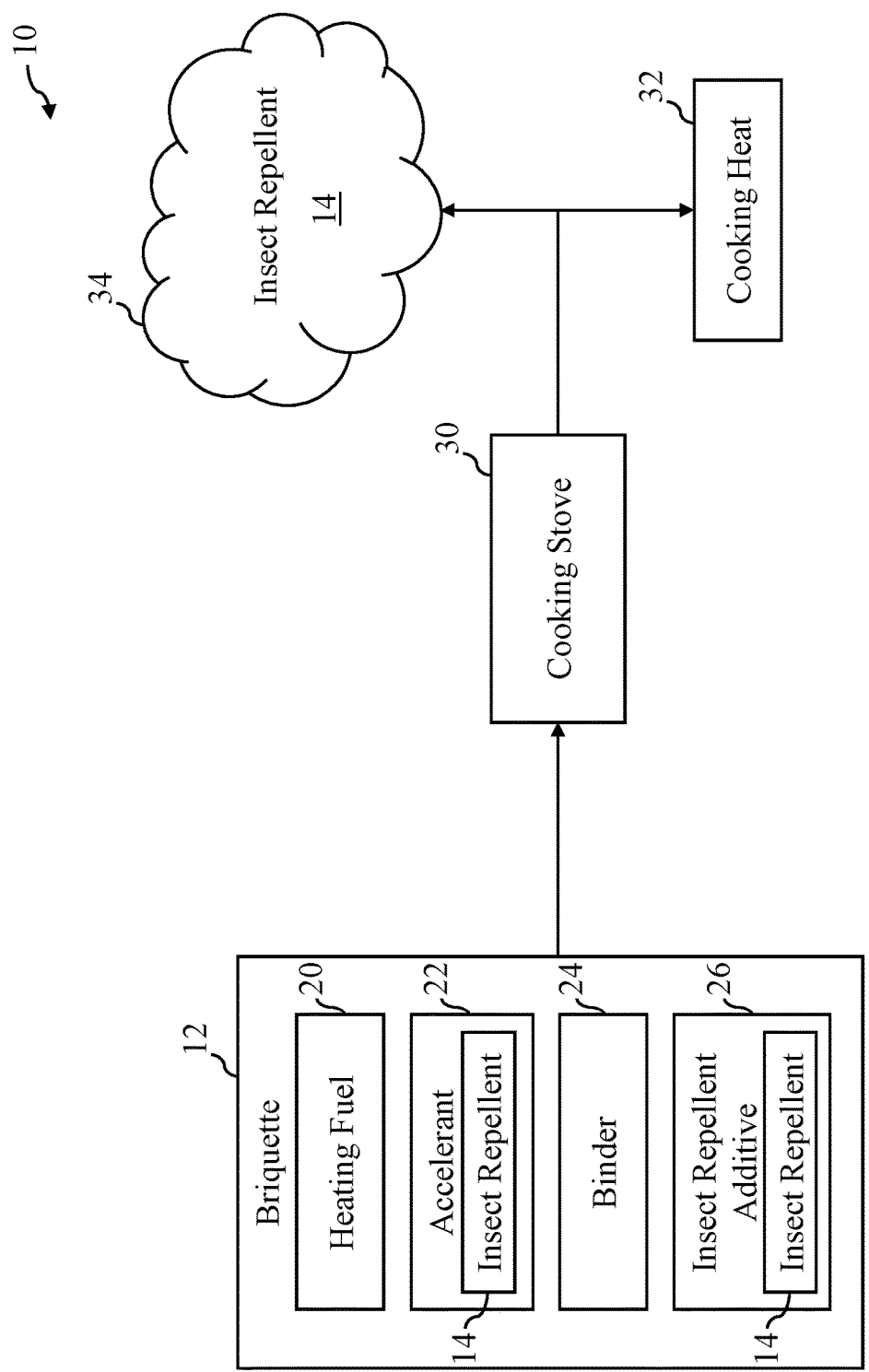
FIG. 1 is a schematic diagram of a briquette burning system, according to one or more embodiments disclosed herein.

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the embodiments of the systems and methods disclosed herein and are therefore not to be considered limiting of the scope of the systems and methods disclosed herein as it may include other effective embodiments as well.

The description may use the phrases "in certain embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous. The terms "about" or "approximately" are defined as being close to as understood by one of ordinary skill in the art. In one non-limiting embodiment, each instance of one of these terms is defined to be within 10%, within 5%, within 1%, or within 0.5%, as would be understood by one of ordinary skill in the art.

As noted above, regions that commonly rely on solid-fuel combustion for cooking may also be inhabited by disease-carrying insects, such as mosquitos that may carry malaria or other viruses, bacteria, or parasites. Malaria is a potentially life-threatening disease that may be transmitted to individuals through the bite of an infected female *Anopheles* mosquito. More specifically, malaria is an acute febrile illness caused by *Plasmodium* parasites, of which five species cause malaria in humans. Among these species, *P. falciparum* is recognized as the deadliest malaria parasite and the most prevalent on the African continent. The widespread and prevalent nature of malaria-carrying mosquitoes increases the difficulty in sufficiently preventing and/or and curing malaria.

In 2021, nearly half of the world's population was at risk of malaria. Certain population groups are at elevated risk of contracting malaria and developing severe disease: infants, children under five years of age, pregnant women, and patients with HIV/AIDS, as well as people with low immunity moving to areas with intense malaria transmission such as migrant workers, mobile populations, and travelers. Over the last two decades, various entities have recommended malaria prevention tools and strategies, such as effective vector control and the use of preventive antimalarial drugs. However, these techniques may utilize significant capital resources that are not available to all regions. Accordingly, there are a number of disadvantages in conventional malaria prevention tools and strategies that may be beneficially addressed by the embodiments disclosed herein.

To address these problems, the embodiments described herein include fuel briquettes (such as charcoal briquettes) that are infused or formulated with one or more sources of an insect repellent so that during combustion, disease-carrying insects may be repelled, which thereby helps to prevent the spread of potentially dangerous diseases and pathogens such as malaria. While any suitable insect repellent (or combination of insect repellents) may be used in the embodiments of the fuel briquettes disclosed herein, in certain embodiments the insect repellent includes pyrethrin. Pyrethrin is toxic to the nervous system of insects and one of the most powerful and effective insecticides for repelling mosquitos. Pyrethrin includes one or more ester-based active compounds and is contained in pyrethrum, which is a crude extract from chrysanthemum plants including *Chrysanthemum cinerariifolium*. Traditionally, pyrethrum may be extracted from the chrysanthemum plants, and the resulting pyrethrum-depleted plant material (known as pyrethrum marc or pymarc) may be discarded as an unwanted byproduct or used as general agricultural waste. However, present embodiments recognize that the pymarc may contain a residual amount of pyrethrin that may be leveraged to further increase the pyrethrin content of fuel briquettes disclosed herein in a cost-effective manner. For instance, certain embodiments may include implementing the pyrethrum (or pyrethrin-containing extract) as an additive to a briquette mixture, while simultaneously repurposing the pymarc generated by production of the pyrethrum as both an accelerant and an additional source of pyrethrin in the briquette mixture. In some embodiments, a single source of pyrethrin may be infused into a briquette mixture.

Indeed, as discussed in more detail below, infusing pyrethrin into briquettes provides a granular, direct, and cost-effective method for malaria prevention. For example, by burning insect repellent briquettes in a stove or other suitable combustion system, an entire surrounding vicinity may become at least partially filled or saturated with vaporized insect repellent, so that insects (such as mosquitos) are driven away. The briquettes of the embodiments disclosed herein may also comprise a clean-burning fuel, including a charcoal heating material having a porous structure that facilitates insect repellent inclusion, oxygen flow, quick ignition, and reduced pollutants. By integrating an insect repellent (such as pyrethrin) into briquettes used for heating and/or cooking, the health and well-being of individuals may be improved, especially in impoverished regions that more commonly rely on solid-fuel combustion as previously described.

FIG. 1 is a schematic diagram of a briquette burning system 10, according to one or more embodiments disclosed herein. The briquette burning system 10 includes one or more briquettes 12 or insect repellent briquettes, of which one is illustrated for further discussion. In certain embodiments disclosed herein, the briquette 12 is a compressed fuel component or fuel briquette that includes combustible materials combined with one or more materials containing an insect repellent 14 that are configured or designed to vaporize when burned, thereby simultaneously providing thermal energy and establishing an insect repellent zone of the insect repellent 14. Additionally, certain embodiments include at least two different sources of the insect repellent 14 to provide additional potency and/or reduced cost for the briquette 12.

Certain embodiments herein are described herein with reference to cooking activities, though the briquette 12 may be used for any suitable activity in which heat and insect repellence are desirable, such as heating a residence or outbuilding, performing an outdoor manufacturing process, and so forth. In addition, while some embodiments described herein relate to the combustion of briquettes in cooking stoves used in impoverished or underserved regions, briquettes according to the embodiments disclosed herein may be utilized in a number of other contexts. For instance, in some embodiments, the insect repellent briquettes disclosed herein may be used in an outdoor barbeque grill to repel insects and thereby reduce insect bites in the immediately surrounding outdoor area (such as a back yard or patio). Indeed, in certain embodiments, the briquette 12 may be used in any suitable cooking device, such as a household cooking stove, a charcoal stove, a grill, a smoker, an oven, and so forth.

In some embodiments (such as the embodiment shown in FIG. 1), the briquette 12 includes a heating fuel 20, an accelerant 22, a binder 24, and an insect repellent additive 26. The briquette 12 may be burned on or within a cooking stove 30 (or other suitable cooking device) to output cooking heat 32 and a cloud 34 or zone containing the insect repellent 14 (such as an insect repellent in at least partially vaporized or gaseous form). As such, a user may prepare food and/or drinks on the cooking stove 30 using the cooking heat 32, and may be simultaneously positioned within, around, or adjacent to the cloud 34 so that the risk of insect bites to the user and/or any other nearby individuals may be reduced or eliminated. The briquette 12 may also be a clean burning fuel that does not significantly contribute to indoor air pollution, unlike certain traditional solid fuels (such as coal, peat, wood, or dung).

The heating fuel 20 may provide a majority of the chemical energy of the cooking heat 32 during burning or combustion of the briquette 12. The heating fuel 20 of certain embodiments includes charcoal dust, charcoal fines, and/or charcoal powder. Charcoal-based fuels may include a porous structure that provides a high surface area to volume ratio for facilitating oxygen flow and efficient ignition. In certain embodiments, the pores or surface area of charcoal may also facilitate adhesion or inclusion of the insect repellent additive 26 within the briquette 12. The heating fuel 20 may generally undergo more complete combustion than traditional solid fuels. As a result, water vapor and carbon dioxide may be the primary products of the combustion of heating fuel 20, and additional pollutants (such as carbon monoxide or carbon-based smoke) that may result from incomplete combustion may be reduced. Further details regarding carbonization of certain heating fuels 20 to improve their combustion properties are provided below with reference to FIG. 2.

The accelerant 22 may be provided in the briquette composition to increase a combustibility or ease of ignition of the briquette 12. For example, the accelerant 22 may generally accelerate combustion of the fuel briquette 12, such as by increasing oxidation of the heating fuel 20 in the fuel briquette 12. As recognized herein, certain embodiments of the accelerant 22 also provide insect repellent properties to the briquette 12. That is, the accelerant 22 may include the insect repellent 14 therein or be a source of the insect repellent 14. In some embodiments, the accelerant 22 includes agricultural waste material that contains a relatively small amount of the insect repellent 14. For example, the accelerant 22 of certain embodiments includes pymarc or pyrethrum marc, which is a byproduct of pyrethrum production. In some embodiments, the pymarc or solid pymarc includes fibrous material or plant fibers that contain a residual amount of pyrethrin, which is further discussed below in conjunction with the insect repellent additive 26.

Certain embodiments may include two or more accelerants 22, such as an insect repellent accelerant 22 containing the insect repellent 14 and an additional accelerant 22 that does not include the insect repellent 14. For instance, the accelerant 22 of some embodiments may include sawdust and/or agricultural waste products. As non-limiting examples, the agricultural waste products may include any residual, inedible, and/or generally less desirable plant material, such as groundnuts, waste/husks of nuts, sugarcane, maize cobs, and so forth. In some embodiments, the accelerant 22 may be omitted from the briquette composition, such as in cases in which the heating fuel 20 is sufficiently combustible alone. Additionally, the binder 24 or binding agent may be provided to bind or hold together the remaining components of the briquette 12. The binder 24 may provide a binding effect based on its mechanical properties, chemical properties, or both. In some embodiments, the binder 24 includes starch, such as tapioca starch, cassava starch, corn starch, wheat starch, or a combination thereof. The binder 24 of some embodiments may additionally or alternatively include clay, soil, or a combination thereof. Embodiments of the binder 24 may be provided in any suitable physical state, such as a solid or a liquid. Additionally, certain embodiments of the briquette 12 may exclude the accelerant 22 and/or the binder 24.

As recognized herein, the insect repellent additive 26 or liquid additive is also included in the briquette composition to provide insect repellent properties to the briquette 12. That is, the insect repellent additive 26 may include the insect repellent 14 therein or be a source of the insect repellent 14. The insect repellent additive 26 may be distributed through the briquette composition, in some embodiments. For instance, in certain embodiments, the insect repellent additive 26 is distributed in interstices, or small spaces, between other components of the briquette composition. As one example, the insect repellent additive 26 and insect repellent 14 thereof may be distributed interstitially between the heating fuel 20, the accelerant 22, and/or the binder 24. In certain embodiments, the insect repellent additive 26 may be a coating layer applied to or infused into an outer surface of the briquette 12. As presently recognized, implementation of the accelerant 22 as a first source or amount of the insect repellent 14 and the insect repellent additive 26 as a second source or amount of the insect repellent 14, different from the first source, may accord an increased effectiveness for repelling insects to the briquette 12 and/or an improved manufacturing cost thereof, while upcycling agricultural waste for increased sustainability.

The insect repellent 14 of certain embodiments may generally include one or more pyrethrins or pyrethrin compounds, such as those in pyrethrum extracted from chrysanthemum plants or flowers. The one or more pyrethrins may include pyrethrin I, pyrethrin II, cinerin I, cinerin II, jasmolin I, jasmolin II, or a combination thereof. In some embodiments in which the insect repellent 14 is a natural plant extract such as pyrethrum, the relative concentration of these molecules may vary based on environmental growth factors. In such cases, a variability between batches may desirably limit or reduce an insect species' ability to develop resistance to the insect repellent 14. Embodiments of the insect repellent 14 and/or insect repellent additive 26 may be provided in any suitable physical state, such as a liquid extract, a powdered extract, and/or any other solid or liquid having the properties disclosed herein.

Certain embodiments of the insect repellent 14 may additionally or alternatively include one or more pyrethroids, which are synthetic molecules manufactured to resemble pyrethrins and their insecticide properties, with an increased shelf life. Additionally or alternatively, the insect repellent 14 may include any suitable insect repellent and/or insecticide. In some cases, the insect repellent 14 provides an insecticide effect to mosquitos and other insects by hyperexcitation of the nervous system, which drives them to leave the area and/or die in response to sufficient doses and/or exposure times. Further details regarding production of the insect repellent 14, the accelerant 22 that may contain insect repellent 14, and the insect repellent additive 26 are provided below with reference to FIG. 3.

According to the present embodiments, the insect repellent 14 may be present within the briquette 12 in an amount sufficient to repel mosquitos from a surrounding area in which the briquette 12 is burned. Embodiments of the insect repellent 14 may be present in an amount that is non-toxic to humans and/or does not negatively affect any consumables within the surrounding area in which the briquette 12 is burned. For example, embodiments of the briquette 12 may include at least 0.01 wt. % (such as at least about 0.01 wt. %) of the insect repellent 14. Certain embodiments of the briquette 12 may include from about 0.01 to about 0.05 wt. % of the insect repellent 14. Embodiments of the briquette 12 may include from about 0.03 to about 0.05 wt. % of the insect repellent 14. Some embodiments of the briquette 12 may include at least 0.03 wt. % (such as at least about 0.03 wt. %) of the insect repellent 14. Embodiments of the briquette 12 may include from about 0.01 to about 0.10 wt. % of the insect repellent 14. Certain embodiments include preparing the briquette 12 with a concentration of the insect repellent 14 similar to certain mosquito coils, which may include active ingredients at concentrations from about 0.01 to about 0.05 wt. %. However, unlike mosquito coils that only repel insects, the briquettes 12 disclosed herein include dual functionality for efficiently repelling insects while generating energy for various residential or household uses (such as cooking as previously described). Additionally, certain embodiments of the briquette 12 may include at least 0.5 wt. % (such as at least about 0.5 wt. %) of the insect repellent 14. In some embodiments, the briquette 12 includes from about 0.4 to about 0.6 wt. % of the insect repellent 14. In some embodiments, the briquette 12 includes no more than about 1 wt. % of the insect repellent 14. As will be understood, the disclosed components of the briquette 12 enable effective adjustment of the amount of the insect repellent 14, such that briquettes 12 may be efficiently manufactured with a desired or target concentration of the insect repellent 14 suitable for repelling insects, while outputting heat.

In certain embodiments, the briquette 12 includes a first portion or first amount of the insect repellent 14 via the accelerant 22 and includes a second portion or second amount of the insect repellent 14 via the insect repellent additive 26. For example, the contribution of the insect repellent 14 from the accelerant 22 and the contribution of the insect repellent 14 from the insect repellent additive 26 may each be at least 0.01 wt. % (such as at least about 0.01 wt. %). In some embodiments, at least 25% of the insect repellent 14 is provided by the accelerant 22 and at least 25% of the insect repellent 14 is provided by the insect repellent additive 26. As such, the accelerant 22 containing may provide at least a portion of the insect repellent 14 to the briquette compositions. Additionally, certain embodiments include providing the insect repellent 14 to the briquette composition in a liquid form (via the insect repellent additive 26) and in a solid form (via the accelerant 22).

In embodiments, the briquette 12 includes a briquette composition or fuel briquette composition having the heating fuel 20, the heating accelerant 22, the binder 24, the insect repellent additive 26, and/or the insect repellent 14 in predetermined amounts and/or ratios. For example, in an embodiment, the briquette composition includes about 65 wt. % of the heating fuel 20, about 28 wt. % of the accelerant 22, and about 7 wt. % of a mixture containing the binder 24 and the insect repellent additive 26. In some embodiments, the briquette composition includes about 0.05 wt. % of the insect repellent 14. In certain embodiments, the heating fuel 20 includes carbonized charcoal powder, the accelerant 22 includes pymarc, and the binder 24 includes a cassava mixture. In some embodiments, the pymarc includes a concentration of pyrethrin or insect repellent 14 ranging between about 0.1 to about 0.2 wt. %. Additionally, the insect repellent additive 26 may include a concentration of pyrethrin or insect repellent 14 ranging between about 0.5 to about 25 wt. %. It should be understood that the insect repellent additive 26 may be diluted or concentrated to any suitable weight percentage of the insect repellent 14 that provides the resulting briquette 12 with sufficient insect repelling properties. Additionally, based on the content of insect repellent 14 in the accelerant 22 and/or the insect repellent additive 26, the specific amounts or ratios of the components of the briquettes may be varied to provide a sufficient concentration of the insect repellent 14. Detailed, non-limiting examples of systems and processes for producing the briquettes 12 are further described with reference to later figures.

Figures 2, 3:
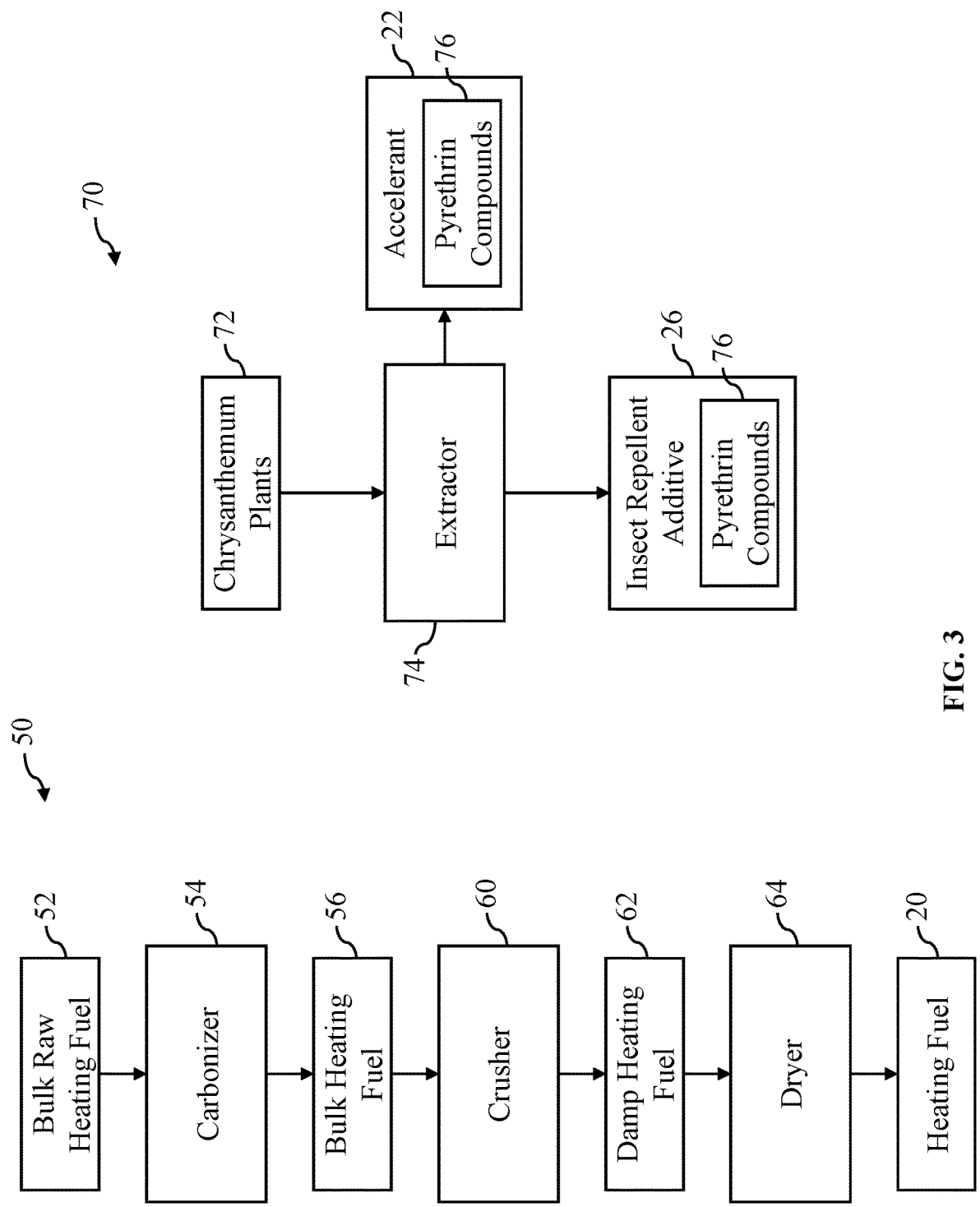
FIG. 2 is a schematic diagram of a carbonization system for producing a heating fuel used in briquettes, according to one or more embodiments disclosed herein.
FIG. 3 is a schematic diagram of an extraction system for producing an insect repellent additive and accelerant used in briquettes, according to one or more embodiments disclosed herein.

FIG. 2 is a schematic diagram of a carbonization system 50 for producing a heating fuel used in briquettes, according to one or more embodiments disclosed herein. Embodiments of the carbonization system 50 may be operated to produce the heating fuel 20 discussed above, such as charcoal dust, fines, and/or powder. In some embodiments, the carbonization system 50 is a part or subsystem of a briquetting system, as discussed with reference to later figures. In the illustrated embodiment, a bulk raw heating fuel 52 is provided to a carbonizer 54 of the carbonization system 50, such as a charcoal kiln or a charcoal carbonization furnace. The bulk raw heating fuel 52 may include any suitable biomass material, such as sugar cane waste, cassava waste, maize cobs, and so forth. The carbonizer 54 of certain embodiments increases a carbon content of the bulk raw heating fuel 52 in a pyrolysis process that adds heat in an oxygen-limited environment to upgrade biomass into more energy-dense biofuels. The conversion within the carbonizer 54 may therefore produce a bulk heating fuel 56, such as a bulk charcoal material.

The carbonization system 50 may also include a crusher 60 that receives and crushes the bulk heating fuel 56 and thereby increases its surface area. For example, the crusher 60 may use mechanical forces (such as via teeth, grinding wheels, pistons, screws, and so forth) to reduce an average size of the bulk heating fuel 56 from pieces, chunks, and/or lumps into powder, dust, and/or fines. In some embodiments, the crusher 60 outputs a damp heating fuel 62 that includes a relatively high moisture content that may be unsuitable for a combustible briquette. For example, the moisture content in the damp heating fuel 62 may have originated within the precursor biomass of the bulk raw heating fuel 52, may have been generated by water-releasing chemical reactions within the carbonizer 54, and/or may have been adsorbed from an ambient environment by the porous charcoal. The carbonization system 50 of certain embodiments may therefore include a dryer 64 to reduce a moisture content of the damp heating fuel 62 and thereby produce the heating fuel 20. In embodiments, the dryer 64 may remove moisture from the damp heating fuel 62 via any suitable process, such as by adding heat thereto. For example, the dryer 64 of certain embodiments may position the damp heating fuel 62 within a sunlight-covered area for a threshold time to evaporate or otherwise remove moisture. In some embodiments, air may be forced over the damp heating fuel 62 to further facilitate drying thereof (such as within the dryer 64). The heating fuel 20 produced by the carbonization system 50 may therefore be prepared and ready for incorporation within briquettes 12.

In certain embodiments, one or more of the carbonizer 54, crusher 60, and/or dryer 64 may be rearranged and/or combined in any suitable combination to produce the heating fuel 20 from the bulk raw heating fuel 52. For example, certain embodiments of the carbonization system 50 may include implementing the dryer 64 before the crusher 60. Additionally, one or more of the carbonizer 54, crusher 60, and/or dryer 64 may be omitted based on properties of the bulk raw heating fuel 52 and/or desired heating fuel 20.

FIG. 3 is a schematic diagram of an extraction system 70 for producing an insect repellent additive and an accelerant used in briquettes, according to one or more embodiments disclosed herein. Certain embodiments of the extraction system 70 may be operated to produce the insect repellent additive 26 and the accelerant 22 that each include insect repellent, such as one or more pyrethrin compounds 76 as described above. In some embodiments, the extraction system 70 is a part or subsystem of a briquetting system, as discussed with reference to later figures. In the illustrated embodiment of the extraction system 70, one or more chrysanthemum plants 72 or chrysanthemum flowers are supplied to an extractor 74. The chrysanthemum of some embodiments may be *Chrysanthemum cinerariifolium*, which produces a high concentration of pyrethrins to provide innate resistance to pests like insects. Certain embodiments may include drying, grinding, and/or filtering the plants or flowers before they are supplied to the extractor 74.

The extractor 74 may include any suitable solvent within a vessel to separate a crude active extract from remaining material of the chrysanthemum plants 72, in certain embodiments. For example, an organic solvent such as kerosene or ester compounds may be used to extract the pyrethrin compounds 76. The pyrethrin compounds 76 may be esters and may include any suitable combination or distribution of pyrethrin I, pyrethrin II, cinerin I, cinerin II, jasmolin I, and jasmolin II, in embodiments. As such, the extraction system 70 may output the crude active extract containing the pyrethrin compounds 76 as the insect repellent additive 26, which may be a liquid that is usable within the briquettes disclosed herein.

The extraction system 70 may also output the remaining material of the chrysanthemum plants 72 as the accelerant 22 or pymarc, which may contain a residual amount of pyrethrin compounds 76. The pymarc may include generally solid plant fibers having the pyrethrin compounds 76 therein, in some embodiments. As such, it is presently recognized that the pymarc may contain a non-zero amount of pyrethrin compounds 76 in a solid form that may be further integrated into the briquettes, instead of discarded as agricultural waste.

Figure 4:
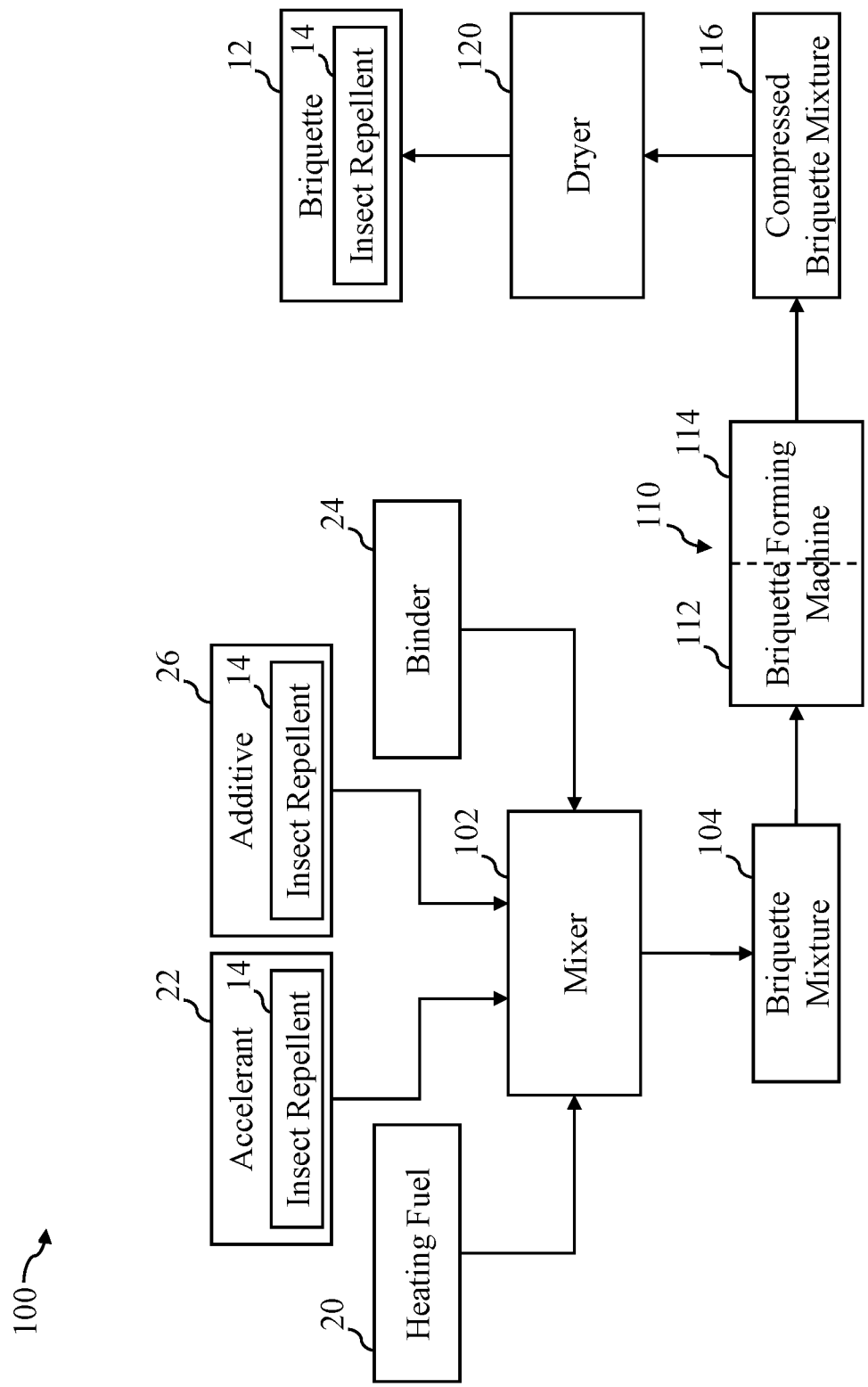
FIG. 4 is a schematic diagram of an example briquetting system for making briquettes with an insect repellent, according to one or more embodiments disclosed herein.

With the above understanding of the use of and base materials in some embodiments of insect repellent briquettes, further details are provided regarding systems and methods for manufacturing the briquettes. For instance, FIG. 4 is a schematic diagram of an example briquetting system 100 for producing briquettes 12 having insect repellent 14 therein, according to one or more embodiments disclosed herein. In embodiments, the briquetting system 100 may include multiple components that cooperate to produce briquettes 12 having the insect repellent 14. For example, the briquetting system 100 may include a mixer 102 having a vessel to receive materials of the briquette 12, such as a tank, container, or bowl. Certain embodiments of the mixer 102 may include a motor (such as an electric motor, hydraulic motor, pneumatic motor, internal combustion engine, and so forth) that drives a stirring component, such as a paddle, baffle, screw, auger, and so forth. For example, the mixer 102 of certain embodiments may be or include a ribbon mixer, paddle mixer, tumble mixer, drum mixer, or other suitable equipment. The mixer 102 may additionally or alternatively include manually operated mixing processes performed by a technician, in certain embodiments.

In embodiments, the heating fuel 20, accelerant 22, binder 24, and insect repellent additive 26 are added to the vessel of the mixer 102 in predetermined ratios, weights, or volumes. As previously described, each of the accelerant 22 and the insect repellent additive 26 include a respective amount or concentration of the insect repellent 14 therein, in certain embodiments. In some embodiments, the insect repellent additive 26 may be mixed with a carrier liquid, such as within the mixer 102 or prior to addition to the mixer 102 to increase an ease with which the insect repellent additive 26 may be dispersed through other components of the briquette 12. The mixer 102 may stir, blend, mix, agitate, or otherwise combine the components in any order to form a briquette mixture 104, having a predetermined briquette composition based on the relative ratios, weights, or volumes of materials added to the mixer 102. After exiting the mixer 102, the briquette mixture 104 may be generally well-stirred, consistent, and/or homogeneous and include the insect repellent 14 distributed therethrough. In some embodiments, the insect repellent 14 is present in plant fibers of the accelerant 22 as well as in interstices, gaps, or spaces between components of the briquette mixture 104 (such as the heating fuel 20, the accelerant 22, and/or the binder 24).

The illustrated briquetting system 100 also includes a briquette forming machine 110 to receive the briquette mixture 104. The briquette forming machine 110 may include any suitable equipment for compressing and/or shaping the briquette mixture 104 into a desired shape, density, and/or form. For example, certain briquette forming machines 110 may generally include a feeding region 112 or feeding device and a compression region 114 or compression device. The briquette mixture 104 may be supplied to the feeding region 112, directed into the compression region 114, compressed into a reduced volume and higher density, and output as a compressed briquette mixture 116. In some cases, the compressed briquette mixture 116 may be produced or extruded into an elongated briquette or briquette string that is then sectioned or cut into individual pieces having a target length or size. Certain machines may output the compressed briquette mixture 116 into individual pieces directly. In certain embodiments, the briquette forming machine 110 may output the compressed briquette mixture 116 as pellets. Indeed, the briquettes 12 produced by the briquetting system 100 may be provided with any target shape, including a rectangular prism, a cylinder, a sphere, a pillow, a prism, a toroid, and so forth. In some embodiments, the briquettes 12 may be provided with a solid shape. In certain embodiments, the briquettes 12 may be provided with a hollow shape, such as a shape having one or more through-holes therein. The one or more through-holes may extend from a first surface of a briquette 12 to an opposite surface of the briquette, in certain embodiments, thereby increasing a surface area of the briquette 12 for burning.

In certain embodiments, the feeding region 112 of the briquette forming machine 110 may stir, shake, agitate, or otherwise mix the briquette mixture 104 it receives. As such, certain embodiments of the briquetting system 100 may include implementing the feeding region 112 of the briquette forming machine 110 to perform all or a portion of the actions performed by the mixer 102. As one example, the heating fuel 20, accelerant 22, and binder 24 may be mixed within the mixer 102 to form an intermediate mixture. Then, the intermediate mixture may be added to the briquette forming machine 110, into which the insect repellent additive 26 is added and mixed with the intermediate mixture to form a final mixture into which the insect repellent additive 26 is distributed. The final mixture may then progress toward the compression region 114 of the briquette forming machine 110 to produce the briquettes 12.

As non-limiting examples of equipment, the briquette forming machine 110 may include a piston press, a screw press, a roller press, an agglomerator, a manual press, and/or any other suitable compression and/or shaping device. Embodiments of a piston press may include a feeding chute with an auger that provides the briquette mixture 104 within a cylindrical piston chamber, in which a piston is driven to compress the briquette mixture 104 into individual cylindrical shapes. Embodiments of a screw press may receive the briquette mixture 104 in a barrel having a tapered, rotating screw that forces the briquette mixture 104 into a reduced volume and then through an extrusion die having a desired shape. Embodiments of a roller press may feed or supply the briquette mixture 104 between two counter-rotating rolls, which press the briquette mixture 104 into individual dies of a target shape.

After exiting the briquette forming machine 110, the compressed briquette mixture 116 may include a relatively high moisture content that may be unsuitable for a combustible briquette. As such, the compressed briquette mixture 116 may be provided to a dryer 120 of the briquetting system 100 that removes or reduces its moisture content and produce the briquettes 12 having the insect repellent additive 26 infused therein or distributed therethrough. In embodiments, the dryer 120 may remove moisture using heat or energy supplied by an oven, a heater, the sun, or other source. In some embodiments, the compressed briquette mixture 116 may be machine-dried or sun-dried in temperatures that are equal to or below 60° C. As one example, the dryer 120 of certain embodiments may position the compressed briquette mixture 116 within a sunlight-covered area for a threshold time to remove moisture from the briquettes 12. In some embodiments, air or wind may be directed over the compressed briquette mixture 116 to further facilitate drying thereof (such as within the dryer 120). The briquettes 12 having insect repellent 14 therein may therefore be manufactured and ready for their dual-purpose uses of providing cooking heat while simultaneously repelling insects from a surrounding area.

Figure 5:
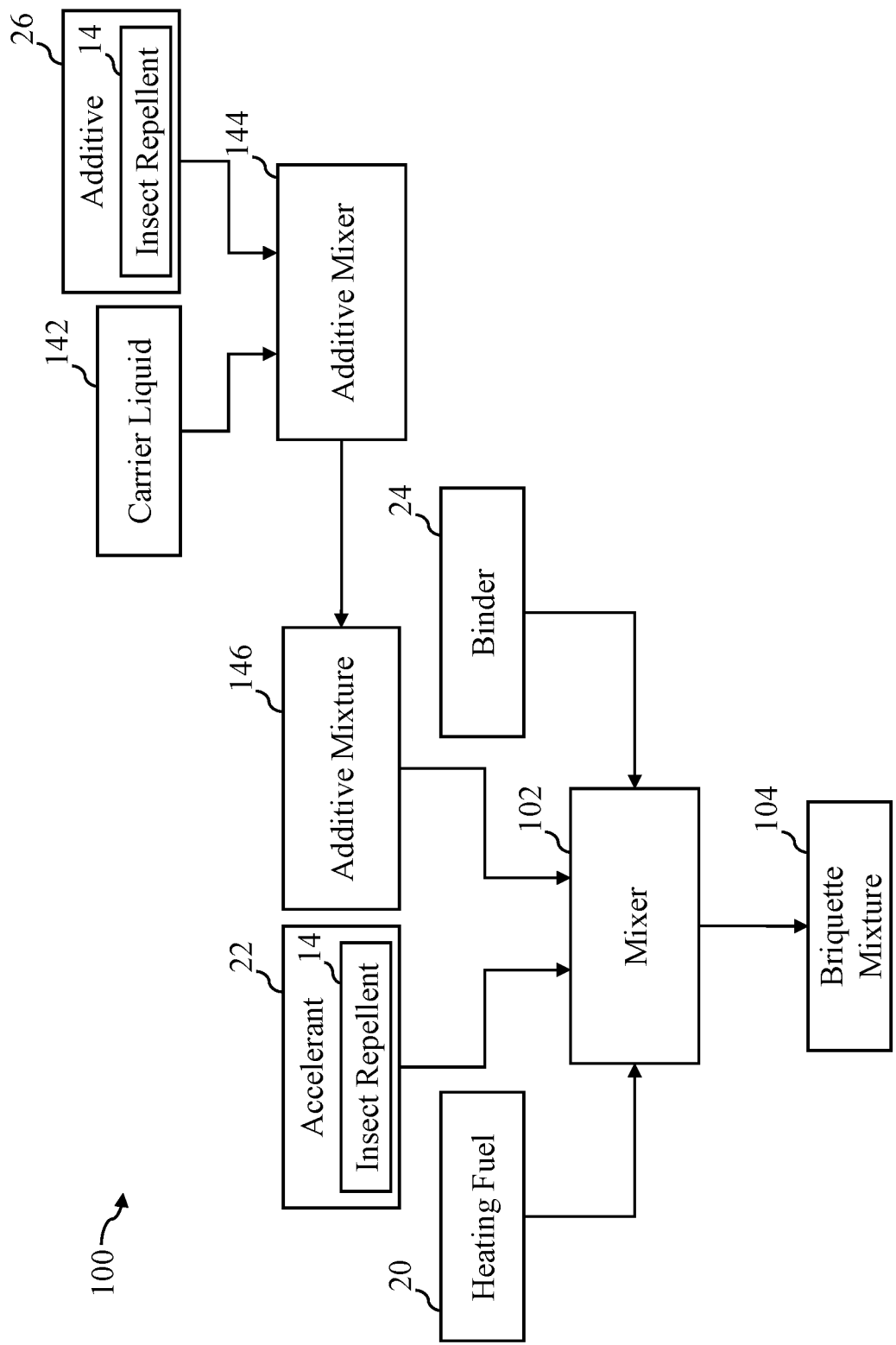
FIG. 5 is a schematic diagram of an example of a briquetting system having an additive mixer to produce an additive mixture, according to one or more embodiments disclosed herein.

The briquetting system 100 may include alternative arrangements and/or combinations of equipment to facilitate briquette preparation, in embodiments. For example, FIG. 5 is a schematic diagram of an example of an upstream portion of the briquetting system 100 having an additive mixer 144, according to one or more embodiments disclosed herein. In the illustrated embodiment, the insect repellent additive 26 is pre-mixed with a carrier liquid 142 in the additive mixer 144 to produce an additive mixture 146. For example, the carrier liquid 142 may be any suitable component suitable for increasing an ease with which the insect repellent additive 26 may be dispersed through the remaining briquette materials.

In some embodiments, the insect repellent additive 26 is a non-polar or hydrophobic substance or liquid. In some embodiments, the carrier liquid is or includes an organic solvent or non-polar solvent that may be used to form a solution with or dilute the insect repellent additive 26. In some embodiments, the carrier liquid 142 is or includes water or a polar solvent that may be used to disperse or emulsify the insect repellent additive 26. Some of these embodiments may include an added emulsifying agent to facilitate the emulsification. Certain embodiments may exclude an emulsifier, and the polar carrier liquid may be utilized to facilitate the infusion of the insect repellent additive 26 into the remaining briquette materials.

The additive mixture 146 may be provided into the mixer 102 in a target volume and/or concentration to produce the desired insect repellent properties for briquettes. Following the predetermined amounts and/or ratios of the briquette composition disclosed herein, the additive mixture 146 may be mixed with the heating fuel 20, accelerant 22, and binder 24 within the mixer 102 and/or briquette forming machine 110. As previously described, each of the accelerant 22 and the insect repellent additive 26 include a respective amount or concentration of the insect repellent 14 therein, in certain embodiments. As such, the briquette mixture 104 discussed above is produced with two sources of the insect repellent 14 and may be shaped, compressed, and dried to form the insect repellent briquettes. Additionally, the dryer 120 may remove the carrier liquid 142 in addition to any other moisture above a threshold level from within the briquette mixture 104.

Figure 6:
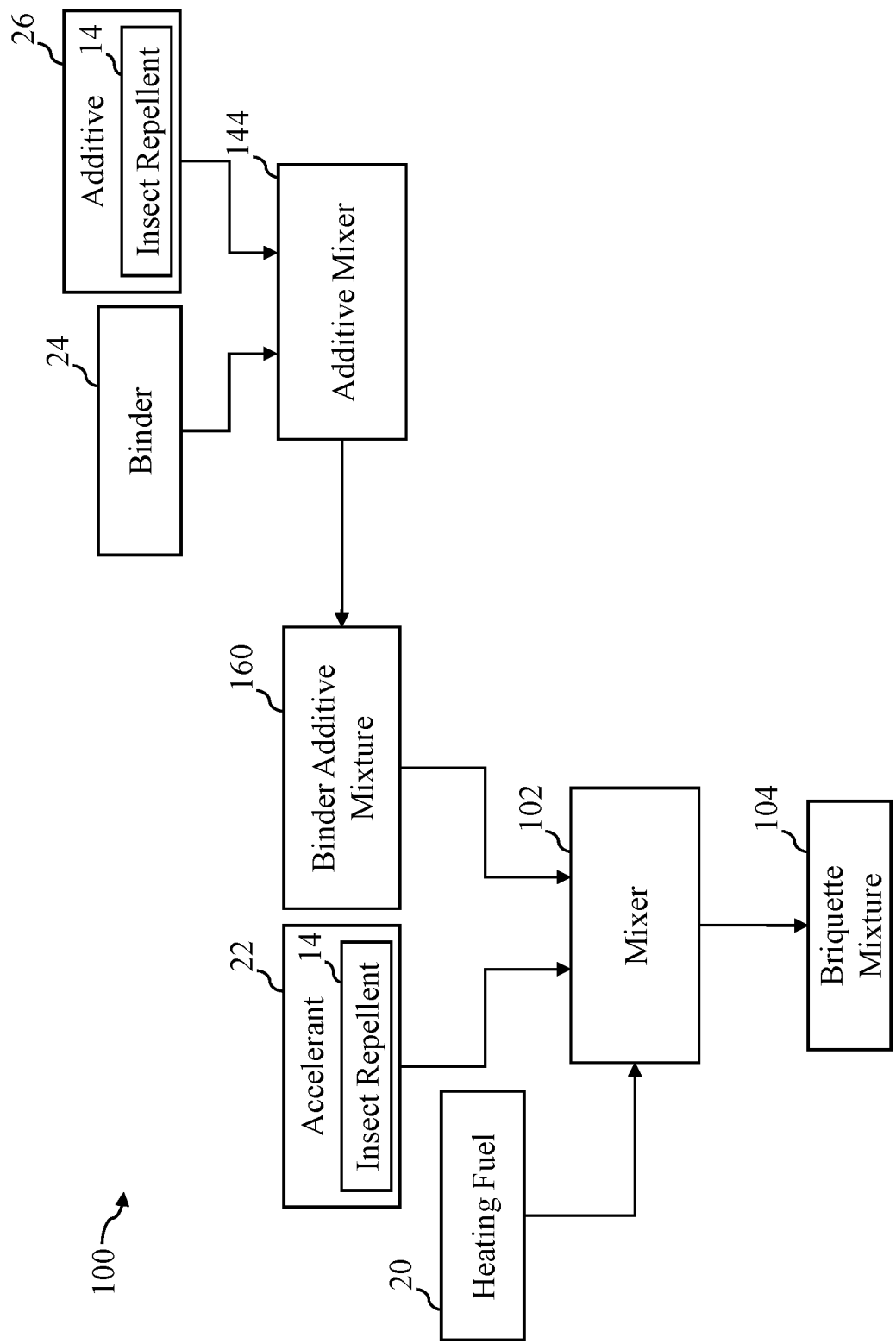
FIG. 6 is a schematic diagram of an example of a briquetting system having an additive mixer to produce a binder additive mixture, according to one or more embodiments disclosed herein.

As another example, FIG. 6 is a schematic diagram of an example of the upstream portion of the briquetting system 100 having the additive mixer 144, according to one or more embodiments disclosed herein. In the illustrated embodiment, the insect repellent additive 26 is pre-mixed with the binder 24 in the additive mixer 144 to produce a binder additive mixture 160. The binder additive mixture 160 may be prepared with a predetermined ratio between the binder 24 and the insect repellent additive 26. In some embodiments, the binder 24 may include a solid or powder physical state that may be efficiently mixed with or mixed into the insect repellent additive 26. The insect repellent additive 26 may be provided with a liquid physical state that dissolves or otherwise combines with the binder 24, in certain embodiments. Following the predetermined amounts and/or ratios of the briquette composition disclosed herein, the binder additive mixture 160 may be mixed with the heating fuel 20 and the accelerant 22 within the mixer 102 and/or briquette forming machine 110. As such, the briquette mixture 104 may be manufactured with two sources of the insect repellent 14 and may be further processed to produce the insect repellent briquettes.

Figure 7:
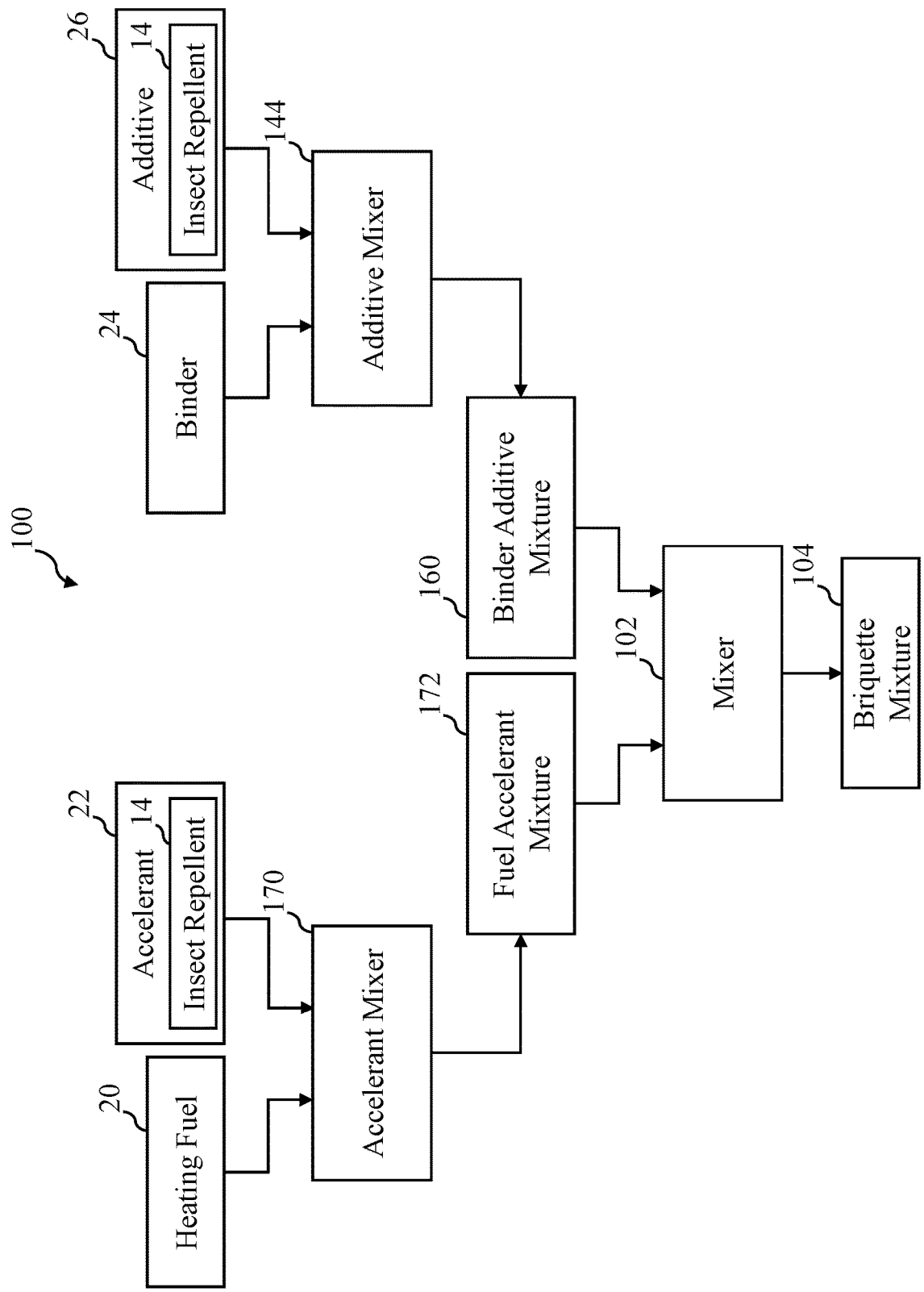
FIG. 7 is a schematic diagram of an example of a briquetting system having an additive mixer to produce a binder additive mixture and having an accelerant mixer to produce a fuel accelerant mixture, according to one or more embodiments disclosed herein.

As a further example, FIG. 7 is a schematic diagram of an example of the upstream portion of the briquetting system 100 having the additive mixer 144 and an accelerant mixer 170, according to one or more embodiments disclosed herein. In the illustrated embodiment, the insect repellent additive 26 is pre-mixed with the binder 24 in the additive mixer 144 to produce a binder additive mixture 160. As discussed above, the binder additive mixture 160 may be prepared with a predetermined ratio between the binder 24 and the insect repellent additive 26. Additionally, in the illustrated embodiment, the accelerant 22 is pre-mixed with the heating fuel 20 in the accelerant mixer 170 to produce a fuel accelerant mixture 172. The fuel accelerant mixture 172 may be prepared with a predetermined ratio between the accelerant 22 and the heating fuel 20, in certain embodiments.

Following the predetermined amounts and/or ratios of the briquette composition disclosed herein, the binder additive mixture 160 may be mixed with the fuel accelerant mixture 172 within the mixer 102 and/or briquette forming machine 110. That is, certain embodiments may include forming two intermediate mixtures that each include a certain amount or concentration of the insect repellent 14 therein, one sourced from the accelerant 22 and the other sourced from the insect repellent additive 26. In some embodiments, this manufacturing system may provide improved control and visibility over the amount or concentration of insect repellent 14 in the resulting briquette mixture 104. As such, the briquette mixture 104 may be manufactured with two sources of the insect repellent 14 and may be further processed to produce the insect repellent briquettes.

As a non-limiting example of using the present system, in certain embodiments, the insect repellent additive 26 may include about 0.5 wt. % of insect repellent 14, or be diluted to this concentration via an organic solvent. In some embodiments, the heating fuel 20 includes charcoal powder, the accelerant 22 includes pymarc, the binder 24 includes cassava liquid, and/or the insect repellent 14 includes pyrethrin. Additionally, the accelerant 22 may include about 0.1% to 0.2% wt. % of insect repellent 14, in certain embodiments. In some embodiments, the insect repellent additive 26 may be mixed with the binder 24 in a ratio of about 30:70 by weight to form the binder additive mixture 160. Additionally, in some embodiments, the accelerant 22 may be mixed with the heating fuel 20 in a ratio of about 30:70 by weight to form the fuel accelerant mixture 172. In some embodiments, the binder additive mixture 160 is generally liquid and the fuel accelerant mixture 172 is generally solid. In certain embodiments, the binder additive mixture 160 and the fuel accelerant mixture 172 may then be mixed together in a ratio of about 7:93 by weight to form the briquette mixture 104. In some embodiments, the binder additive mixture 160 and the fuel accelerant mixture 172 may mixed in a ratio of about 5:95, about 10:90, about 15:85, or about 20:80 by weight, depending on the concentrations of insect repellent 14 in the starting materials and the target concentration of the briquette mixture 104.

In certain embodiments following the concentrations and ratios of this non-limiting example, the binder additive mixture 160 includes 0.15 wt. % of the insect repellent 14, and the fuel accelerant mixture 172 includes 0.03 wt. % to about 0.06 wt. % of the insect repellent 14. Then, following the 7:93 ratio, the briquette mixture 104 may include 0.039 wt. % to 0.067 wt. % of the insect repellent 14, which provides a suitable concentration for repelling flying insects from surrounding environments. As such, although the accelerant 22 may include a relatively low concentration of the insect repellent 14, the briquette compositions disclosed herein may include a relatively high ratio of the accelerant 22 to reduce an amount of the insect repellent additive 26 that may otherwise be used to reach target concentrations of the insect repellent 14.

Figure 8:
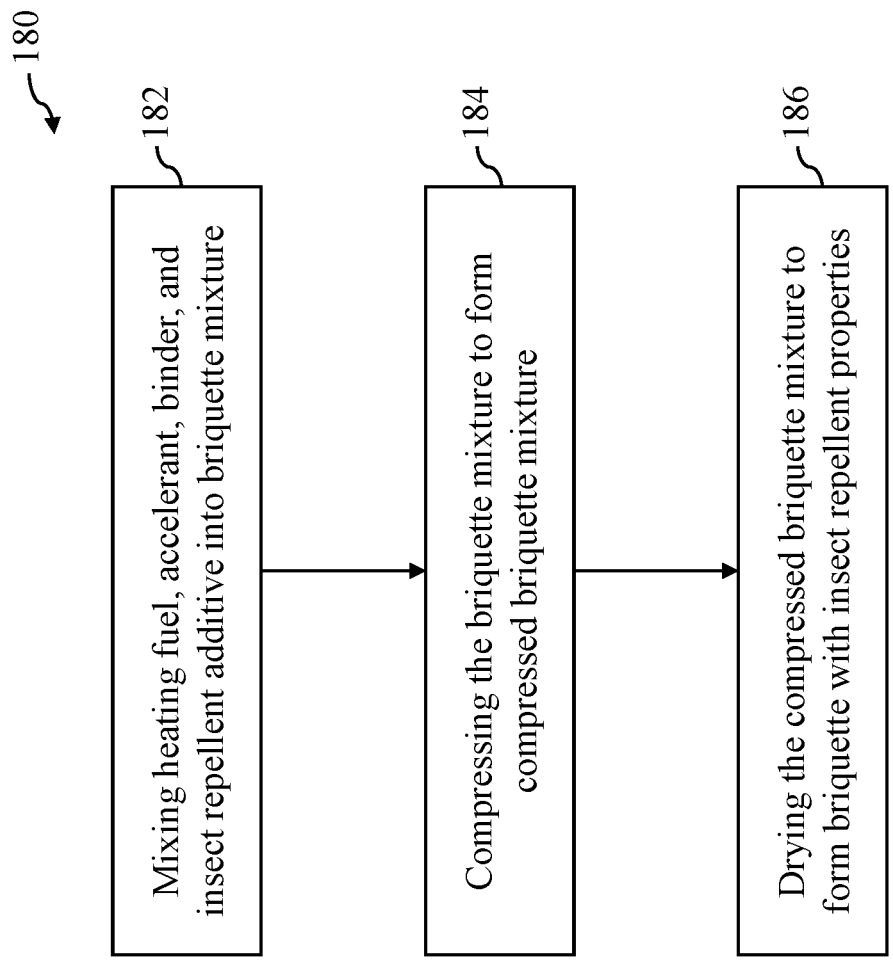
FIG. 8 is a flow diagram of a method for producing briquettes, according to one or more embodiments disclosed herein.

FIG. 8 is a flow diagram of a method 180 for producing the briquettes 12, according to one or more embodiments disclosed herein. At block 182, the method 180 includes mixing a heating fuel 20, an accelerant 22, a binder 24, and an insect repellent additive 26 to form a briquette mixture 104. In some embodiments, the insect repellent additive 26 may be mixed with a carrier liquid (for example, within the mixer 102 or prior to addition to the mixer 102). The briquette mixture 104 may include a predetermined briquette composition that includes the insect repellent additive 26 dispersed throughout the other materials. The mixing of block 182 may be performed by the mixer 102, in certain embodiments. All or a portion of the mixing of block 182 may be performed by a feeding region 112 of a briquette forming machine 110, in embodiments. Additionally, the various components of the briquette mixture 104 may be combined in any suitable order. For example, each of the heating fuel 20, accelerant 22, binder 24, and insect repellent additive 26 may be combined at once; pairs of the heating fuel 20, accelerant 22, binder 24, and insect repellent additive 26 may be mixed to prepare intermediate mixtures, which are then combined; each of the heating fuel 20, accelerant 22, and binder 24 may be mixed first to form an intermediate mixture into which the insect repellent additive 26 is added, and so forth.

At block 184, the method 180 includes compressing the briquette mixture 104 to form compressed briquette mixture 116. The compressing of block 184 may be formed by a compression region 114 of the briquette forming machine 110, in some embodiments. As such, the compressed briquette mixture 116 is provided with desired properties including a target density, a target shape, a target size, a target weight, a target insect repellence, and so forth. At block 186, the method 180 includes drying the compressed briquette mixture to form a briquette 12 with insect repellent properties. In an embodiment, the drying of block 188 is performed by the dryer 120. The compressed briquette mixture 116 is thus dried to form the briquette 12 having the insect repellent additive 26 distributed therein. The briquette 12 may therefore be packaged and/or distributed to enable individuals to burn them within stoves to protect their personal surroundings from mosquitos, while generating heat for cooking and other residential purposes.

Figure 9:
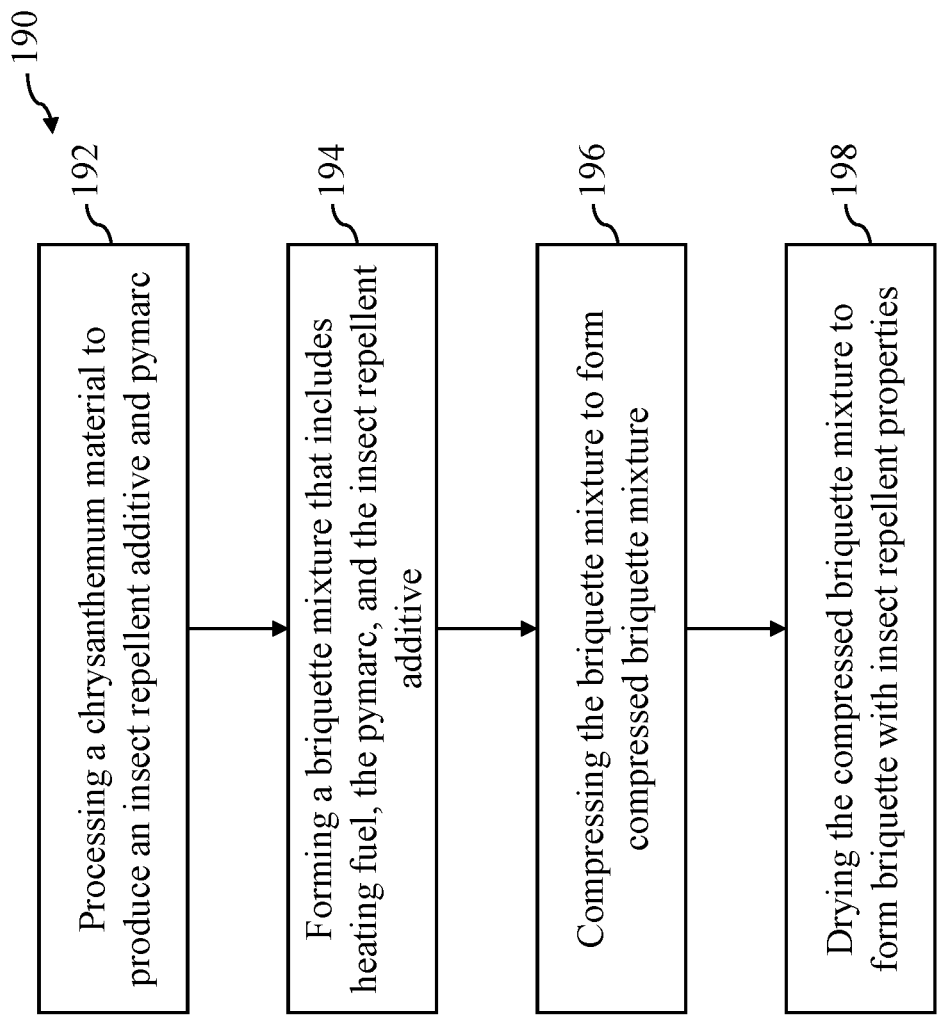
FIG. 9 is a flow diagram of a method for producing briquettes, according to one or more embodiments disclosed herein.

FIG. 9 is a flow diagram of a method 190 for producing the briquettes 12, according to one or more embodiments disclosed herein. At block 192, the method 190 includes processing a chrysanthemum material to produce an insect repellent additive and pymarc. For example, as discussed above with respect to FIG. 3, an extraction system may process chrysanthemum material, plants, or flowers to extract an insect repellent additive therefrom, where the remaining material of the chrysanthemum plants is output as pymarc.

At block 194, the method 190 includes forming a briquette mixture 104 that includes heating fuel, the pymarc, and the insect repellent additive. In some embodiments, as discussed above with respect to FIG. 7, forming the briquette mixture at block 194 includes combining the heating fuel and the accelerant to form a first intermediate mixture, combining the binder with the insect repellent additive or a diluted solution of the insect repellent additive to form a second intermediate mixture, and combining the first intermediate mixture with the second intermediate mixture to form the briquette mixture. At blocks 196 and 198, the method 190 respectively includes compressing the briquette mixture to form compressed briquette mixture and drying the compressed briquette mixture to form briquette with insect repellent properties. In some embodiments blocks 196 and 198 generally correspond to blocks 184 and 186 of FIG. 8, which are described above.

Figure 10:
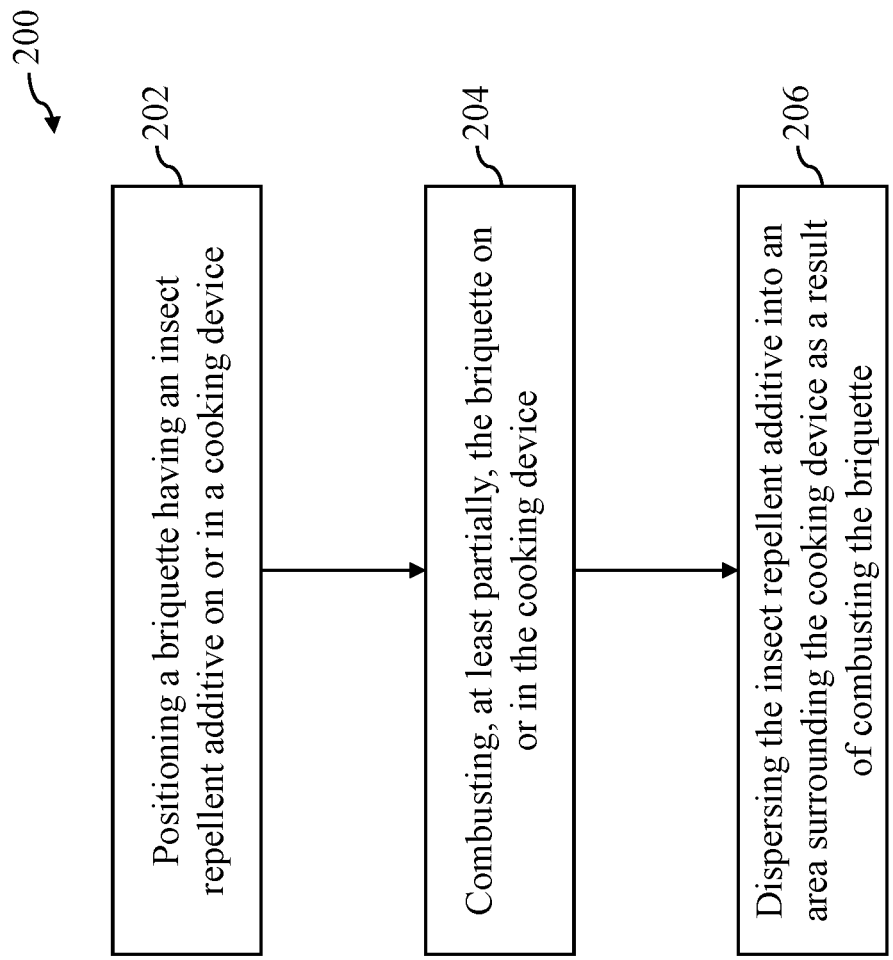
FIG. 10 is a flow diagram of a method for repelling insects by using fuel briquettes, according to one or more embodiments disclosed herein.

FIG. 10 is a flow diagram of a method 200 for repelling insects, according to one or more embodiments disclosed herein. At block 202, the method 200 includes positioning a briquette 12 having an insect repellent additive 26 on or in a cooking device. In some embodiments, a user of the cooking device may position one or more insect repellent briquettes 12 within a chamber and/or onto a surface of the cooking device in preparation of a cooking activity. As previously described above, the briquette 12 may include the insect repellent additive 26 combined with the heating fuel 20, the accelerant 22, and/or the binder 24 respectively provided in predetermined amounts and/or ratios. The cooking device may include any suitable equipment used for preparing meals, food, or other consumables. For instance, in certain embodiments, the cooking device includes a household cooking stove, a charcoal stove, a grill, a smoker, an oven, and so forth. For example, certain embodiments of the cooking device include the cooking stove 30 of FIG. 1.

At block 204, the method 200 includes combusting, at least partially, the briquette 12 on or in the cooking device. For example, the user may use a match, lighter, flint, flame, or other ignition source to ignite the briquette 12 of the cooking device. In response to the ignition source, the briquette 12 may therefore undergo combustion that converts chemical energy of the briquette into thermal energy and products of combustion (including carbon dioxide and water vapor). At block 206, the method 200 includes dispersing the insect repellent additive 26 into an area surrounding the cooking device as a result of combusting the briquette 12. In embodiments, the combustion of the briquette 12 vaporizes the insect repellent additive 26 thereof along with the products of combustion, to thereby repel insects from a surrounding area. As such, combusting or burning the briquette may produce a zone or cloud having the insect repellent additive 26 in at least partially vaporized or gaseous form. Therefore, the user may prepare food and/or drinks via the cooking device, with a reduced or eliminated risk of insect bites to the user and/or any other nearby individuals.

Although specific terms are employed herein, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A fuel briquette composition comprising:
   a heating fuel;
   a first source of an insect repellent; and
   a second source of the insect repellent, wherein the second source is different from the first source.

2. The fuel briquette composition of claim 1, wherein the insect repellent comprises one or more pyrethrin compounds.

3. The fuel briquette composition of claim 1, wherein the first source comprises a liquid additive.

4. The fuel briquette composition of claim 3, wherein the second source comprises a byproduct from production of the liquid additive.

5. The fuel briquette composition of claim 1, wherein the first source is a liquid material and the second source is a solid material.

6. The fuel briquette composition of claim 5, wherein the first source comprises pyrethrum extracted from chrysanthemum plants.

7. The fuel briquette composition of claim 6, wherein the second source comprises pymarc.

8. The fuel briquette composition of claim 1, wherein the second source is configured to accelerate combustion of the fuel briquette.

9. The fuel briquette composition of claim 1, wherein the insect repellent is at least 0.03 wt. % of the fuel briquette composition.

10. The fuel briquette composition of claim 9, wherein the fuel briquette further comprises (i) an accelerant that includes the second source of the insect repellent and (ii) a binder, and wherein:
   the heating fuel comprises charcoal powder and is approximately 65 wt. % of the fuel briquette composition;
   the accelerant is approximately 28 wt. % of the fuel briquette composition; and
   a mixture of the insect repellent and the binder is approximately 7 wt. % of the fuel briquette composition.

11. A fuel briquette comprising:
a heating fuel;
an accelerant comprising pymarc;
a first amount of pyrethrin distributed interstitially between the heating fuel and the accelerant; and
a second amount of pyrethrin contained within the pymarc, wherein the first amount of pyrethrin and the second amount of pyrethrin are configured to vaporize with products of combustion of the heating fuel to thereby repel insects from a surrounding area.

12. The fuel briquette of claim 11, wherein the fuel briquette comprises at least 0.03 wt. % of pyrethrin.

13. The fuel briquette of claim 12, wherein at least 0.01 wt. % of the pyrethrin in the fuel briquette is sourced from the pymarc.

14. The fuel briquette of claim 12, comprising a liquid additive that includes the first amount of pyrethrin, wherein at least 0.01 wt. % of the pyrethrin in the fuel briquette is sourced from the liquid additive.

15. The fuel briquette of claim 14, wherein the liquid additive is an extraction from the pymarc.

16. The fuel briquette of claim 11, comprising a binder and an additional accelerant, wherein the binder comprises one or more of starch, clay, or soil, and wherein the additional accelerant comprises agricultural waste or sawdust.

17. A method of making a fuel briquette, the method comprising:
(a) processing a chrysanthemum material to produce a liquid additive and a solid pymarc;
(b) forming a briquette mixture that comprises:
a heating fuel;
the solid pymarc; and
the liquid additive;
(c) compressing the briquette mixture with a compression machine to form a compressed briquette mixture; and
(d) drying the compressed briquette mixture to form a fuel briquette.

18. The method of claim 17, wherein the fuel briquette comprises at least 0.03 wt. % of pyrethrin contributed partially from the liquid additive and partially from the solid pymarc.

19. The method of claim 17, wherein forming the briquette mixture comprises:
forming a first intermediate mixture from at least the heating fuel and the solid pymarc;
forming a second intermediate mixture from at least a binder and the liquid additive; and
combining the first intermediate mixture with the second intermediate mixture to form the briquette mixture.

20. The method of claim 19, comprising diluting the liquid additive with a solvent, wherein drying the compressed briquette mixture evaporates the solvent.

* * * * *